June 17, 1969    J. H. CREIGHTON ET AL    3,450,213
SCRAPER IMPLEMENT

Filed July 1, 1965

INVENTORS
JOHN H. CREIGHTON,
FRANCIS M. BRINKMEYER &
BY   PAUL E. HANSER

William A. Murray
ATTORNEY

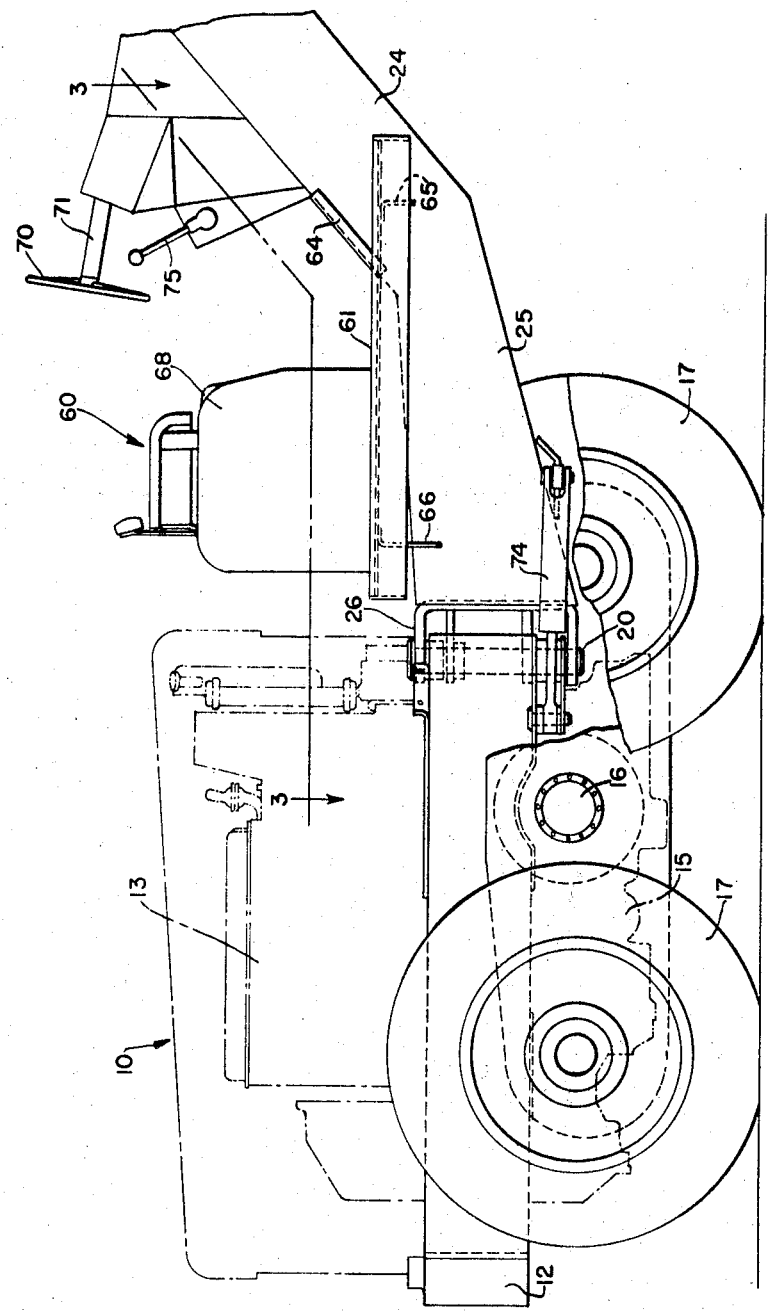

INVENTORS
JOHN H. CREIGHTON,
FRANCIS M. BRINKMEYER &
PAUL E. HANSER
BY William A. Murray
ATTORNEY

United States Patent Office 3,450,213
Patented June 17, 1969

3,450,213
SCRAPER IMPLEMENT
John H. Creighton, Davenport, Iowa, and Francis M. Brinkmeyer and Paul E. Hanser, Rock Island, Ill., assignors to Deere & Company, Moline, Ill., a corporation of Delaware
Filed July 1, 1965, Ser. No. 468,744
Int. Cl. E02f *3/12;* B60k *17/30*
U.S. Cl. 172—785
15 Claims

ABSTRACT OF THE DISCLOSURE

A grader type implement composed of a rear frame supported on traction wheels and an elongated beam supported at its forward end on support wheels and pivotally connected at its rear end on the rear frame to swing laterally, extensible and retractable links extending between the frame and beam, and a platform supported on the beam and extending from the beam over the links.

---

This invention relates to a land grading and leveling implement of the type having a rear tractor vehicle with a forwardly projecting elongated beam that is connected to the vehicle and is supported at its forward end by a pair of support wheels. Still more particularly the invention relates to earth working devices supported on the beam, the supporting structure for the devices, and the arrangement of operator's station on the implement which gives an improved line of vision forwardly of the implement and to the earth working devices.

In an implement of the above type, a fore-and-aft extending beam is normally rigid with the tractor and the entire implement is steered by controlling the front support wheels on the beam. In some instances the beam may be supported on the tractor to swivel laterally about a fore-and-aft extending pivotal connection. In this latter type of design, additional steering means are provided by having extensible and retractable links in the form of hydraulic cylinders that effect the lateral swiveling or swinging of the beam. Heretofore in both types of implements, it has always been the practice to mount the operator's station on the tractor vehicle itself. Since there is required considerable supporting structure to carry the earthworking devices on the beam, it has often been difficult for the operator to properly see the work being done by the earthworking devices as well as having the proper line of vision forwardly of the implement so as to properly guide or steer the implement. In most instances there has been somewhat of a compromise position whereby the operator could generally see the operation of the devices as well as the area in front of the implement. However, such a location of the operator's station is not completely satisfactory throughout all operations of the implement.

With the above in mind, it is the purpose of the present invention to provide on the beam itself an operator's station with controls for positioning the earth-working devices, for steering the front support wheels, and for the operation of the tractor parts. The improvement resides in an elongated fore-and-aft extending beam having front and rear ends with the rear end pivotally supported on the tractor frame so as to swivel laterally about its rear end. Extensible and retractable link means that includes hydraulic steering cylinders are provided between the frame and beam and control the lateral movement or swiveling of the beam. The beam is composed of a forward portion extending rearwardly from the front end and a rear portion that extends from a lower rear end connected to the tractor frame upwardly and forwardly to join the forward portion. Generally the entire beam may be considered as humpback with the juncture between the front and the rear portions being at the hump. Earthworking devices are supported in underlying relation on the beam by supporting structure composed of a transverse rigid beam in overlying relation to the fore-and-aft extending beam and having opposite transverse ends on opposite sides of the fore-and-aft beam. Extensible and retractable links in the form of hydraulic cylinder and rams extend between the outer ends of the transverse beam and an earthworking device so as to permit tilting of the device. An operator's station is provided on the rear portion of the fore-and-aft extending beam so as to be closely adjacent the swivel connection and to extend partially over the steering cylinders. The station is positioned at a level whereby an operator in occupancy of the station may have a line of vision directed forwardly of the implement and over the transverse beam. Control mechanism for operating the tractor and hydraulic systems and controls of the implement is positioned at least partially at the level of the hump and in a manual operating zone of an operator positioned in the operator's station. Generally the control levers and steering mechanism are at the level of the hump and project in a substantial rearward continuation of the front portion of the fore-and-aft extending beam.

Normally an implement of the above type has two earthworking devices positioned between the front support wheels and the tractor. With the operator's station above the rear portion of the beam, it is desirable to place one of the earthworking devices forwardly of the front wheels. Since one of the devices is normally a scarifying or ripping type implement, it is proposed in the present invention to position it forwardly of the front support wheels and to carry the device on a pair of parallel linkages projecting forwardly and connected at their rear ends to the forward end of the beam structure.

It is further proposed in the present invention to provide for the earthworking device, suspended from the transverse beam, a lateral or transversely shiftable linkage composed in part of an upper arm pivotally connected to the transverse beam on a fore-and-aft extending beam above and to one side of the fore-and-aft extending beam and depending therefrom to a lower end beneath the fore-and-aft extending beam. An hydraulic ram and cylinder assembly extends from the earthworking device beneath the fore-and-aft extending beam to the lower end of the arm. Upon extension and retraction of the hydraulic ram and cylinder device, the entire earthworking device is shifted laterally. The arm is positioned angularly about its upper pivot by means of a hydraulic locking device between the transverse beam and the arm that may lock the arm in any of a plurality of angular positions in respect to the pivot.

Other purposes and advantages of the present invention will become apparent to those skilled in the art as the nature of the invention is better understood from the following description and as shown in the accompanying drawings.

FIG. 2 is a side view of the rear portion of the implement including the tractor and a rear part of the fore-and-aft extending beam. Portions are broken away to more clearly show mechanism connecting the two portions of the implement.

Figure 1:
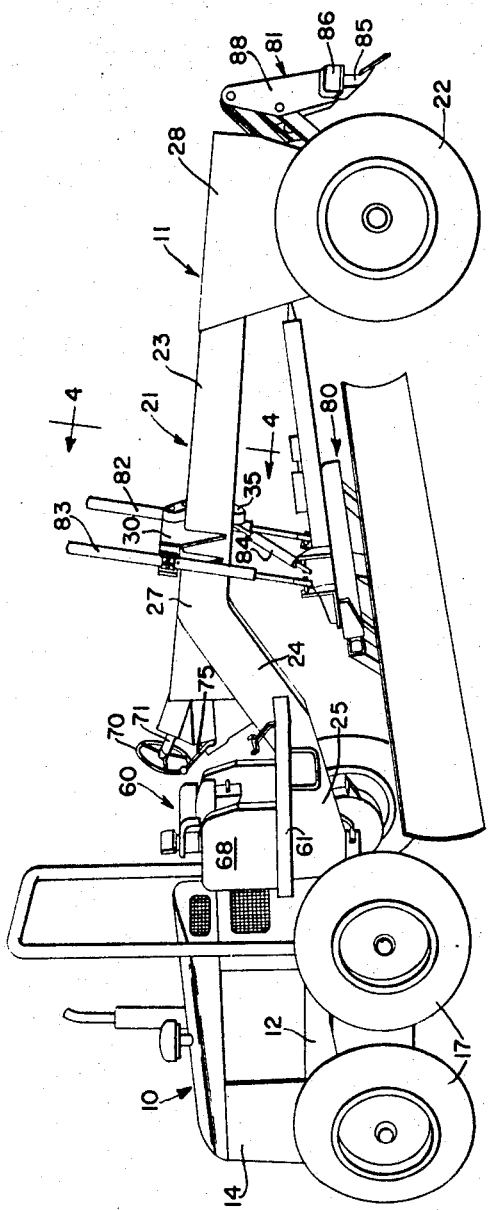
FIG. 1 is a side perspective view of the entire scraper and leveling implement.

The implementing is composed basically of a rear tractor 10 and a forward tool supporting portion 11 for the earthworking devices. The tractor 10 is composed of a main rectangular-shaped frame 12 that underlies and supports a main engine 13 carried under a conventional type hood 14, and a differential gear drive 15. The differential drive 15 terminates in a transverse drive mechanism 16 drivingly connected to fore-and-aft spaced apart traction wheels 17 on opposite sides of the tractor frame 12. All four of the traction wheels 17 are driven and consequently the tractor 10 has a four-wheel drive. The forward transverse portion of the frame 12 is provided with vertically aligned openings that receive a vertical pivot pin 20. As may be seen from viewing FIG. 2, the pivot pin 20 is positioned under the forward end of the tractor 13 and considerably rearwardly of the front traction wheels 17.

The forward portion 11 of the implement that carries the earthworking devices is composed mainly of a fore-and-aft extending beam 21 supported at its forward end on front steerable support wheels 22 and at its rear on the main frame 12 of the tractor 10 and specifically is carried for lateral swinging motion on the vertical pivot pin 20. The beam structure is composed of a front portion 23 that extends rearwardly from the front support wheels 22. The beam 21 includes a rear portion 24 having its rear end connected, as previously explained, to the vertical pivot pin 20 and extending upwardly and forwardly from the rear portion connected to the pin to a juncture with the front portion 23. The rear portion 24 has a rear section 25 that levels off into a substantial horizontal disposition. The rear section 25 has welded at its rear end a connecting element 26 that includes a series of vertically spaced apart horizontal plates having openings therein that receive the pin 20. The beam structure 21 may be considered as being humpbacked with the hump 27 thereof being located at the juncture between the front portion 23 and the rear portion 24. A downwardly opening U-shaped structural shield 28 is provided at the forward end of the beam 21 and is rigidly connected at its lower ends to a transverse wheel support 29 extending outwardly to opposite sides and supporting the front steering wheels 22 at its ends. Fixed to the forward portion 23 of the beam 21 and adjacent the hump 27 is a rigid transverse support or beam 30 that is welded to the beam portion 23 generally in overlying relation thereto. The beam 30 has opposite transverse ends positioned outwardly to opposite sides of the beam portion 23 that swivelly carries yokes 32, 33 at those ends at a level above the beam 23. Supported on the beam 30 and offset to one side of the beam 23 is a fore-and-aft extended pivot pin 34. The pivot pin 34 is above the level of the beam 23 and carries a depending arm 35. Positioned on the transverse beam 30 is a plate 36 with a series of openings 37 that are radially spaced from the pivot pin 34 in angular disposition relative to the axis of the pin 34. Carried on the arm 35 is a hydraulically operated locking device 40 that includes a fore-and-aft and axially adjustable pin 41 movable to positions of registry with the openings 37. The pin 41 extends through the arm 35 and may be inserted in any of the openings 37 to thereby lock the arm 35 against transverse movement. The locking device includes a plate 42 bolted in spaced relation to the arm 35 by means of bolts 43, the latter having spacer tubes 44 thereon that fix the spacing between the plate 42 and the arm 35. The bolts 43 are spaced above and below the pin 41. The device 40 further includes an annular casing 45 formed about the pin 41 and closed at one end by a radial portion bearing against the outer surface of the pin 41 and suitably sealed at 46. Retained within the casing 45 and between the pin 41 and the casing 45 is a piston 47. The piston 47 normally bears against the surface of the arms 35. Suitable seals 48, 49 are provided between the casing 45 and piston 47 and between the piston 47 and the pin 41, respectively. A fluid inlet 50 is provided in the side of the casing 45 and permits fluid to enter into the casing and in the annular gap 51 between the end of the piston 47 and the radial portion of the casing 45. A lock ring 52 is provided to bear against the annular casing 45 and to retain a ring 53 on the pin 41. Surrounding the pin 41 and extending between the plate 42 and ring 53 is a spring 54.

In operation the locking device 40 may be utilized to fix the arm 35 in any of a plurality of positions. Assuming the pin 41 is locked in one of the openings 37, it may be removed from the opening by passing fluid through the inlet 50 so as to force the casing 45 forwardly to thereby carry the pin 41 away from the opening 37. Upon removing the pin 41, the arm 35 may be shifted to a position in which the pin 41 is in registry with a different opening 37. Fluid pressure is then removed from the inlet 50 and the spring 54 forces the pin 41 into the respective opening 37.

Figure 3:
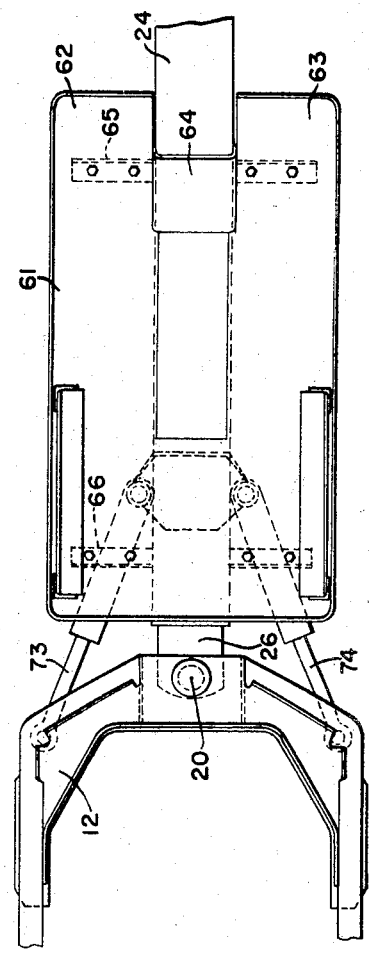
FIG. 3 is a plan view of a portion of the tractor frame and fore-and-aft extending beam taken substantially along the line 3—3 of FIG. 2.
Figure 4:
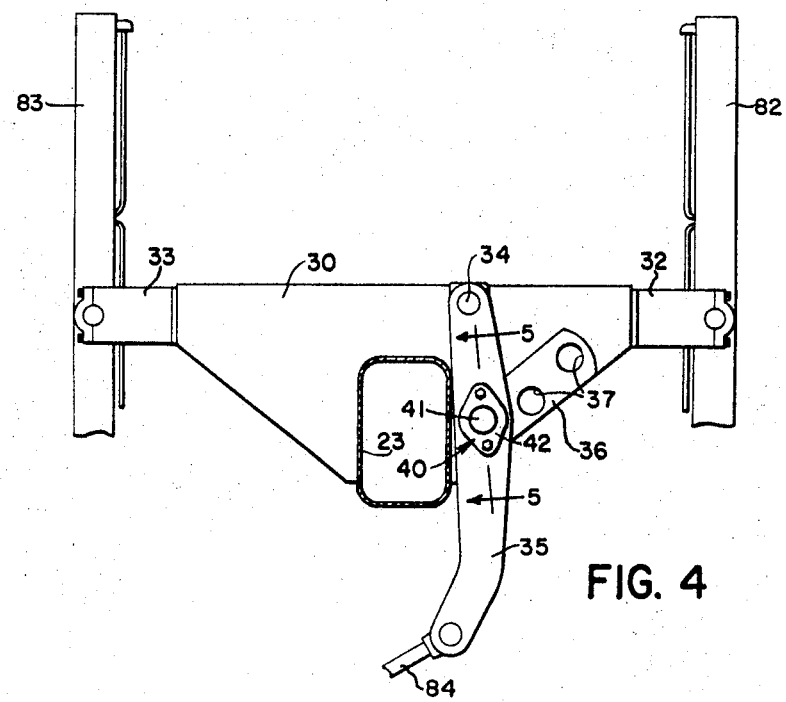
FIG. 4 is a vertical sectional view taken substantially along the line 4—4 of FIG. 1.
Figure 5:
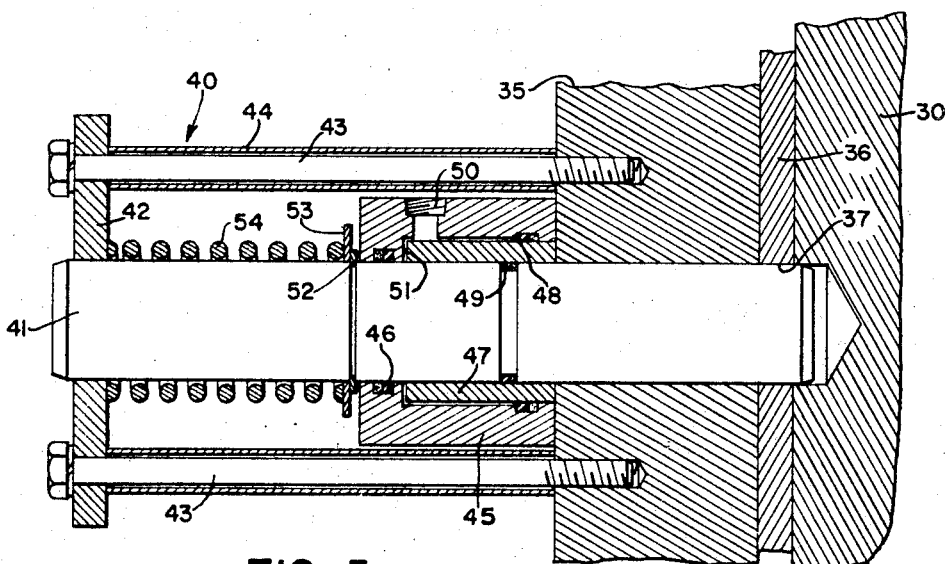
FIG. 5 is an enlarged sectional view taken substantially along the line 5—5 of FIG. 4.
Figure 6:
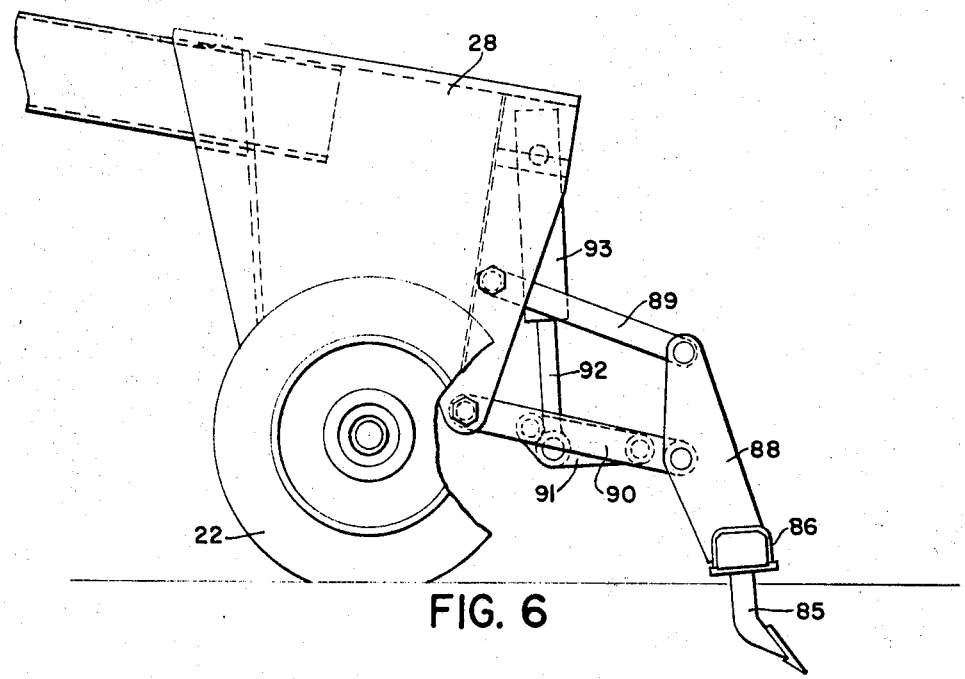
FIG. 6 is a side view of the forward end of the implement with portions broken away to show inner connecting means.
Figure 7:
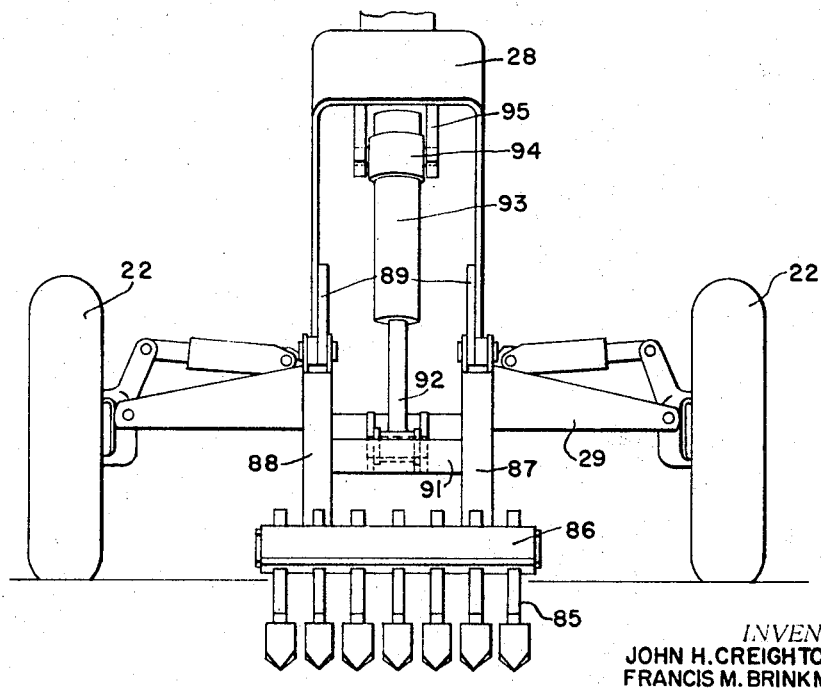
FIG. 7 is a front view of the forward portion of the implement.

An operator's station 60 is supported on the rear portion 24 of the elongated beam 21. The operator's station 60 includes a horizontally disposed platform 61 that has a forward central portion 64 cut and bent upwardly so that the platform 61 is in fact a U-shaped member with one side 62 of the platform being on one side of the beam 21 and the opposite side 63 of the platform 61 being on the other side of the beam portion 23. The portions 62, 63 afford footrests for the operator on the platform 61. The central portion 64 straddles the upper surface of the beam 23 and serves to partially support the platform 61 on the beam 23. The rear portion extends into the confines of the front traction wheels 17 and in the area between the vertical planes of the inboard side of the front traction wheels. Depending structural members at 65, 66 are also utilized for supporting the rear portion of platform 61 on the beam portion 24. As is clear from viewing FIG. 3, the rear portion of platform 61 is closely adjacent pivot 20 so as to provide comfort for the operator as the beam 21 is swung on the pivot, it being understood the closer the operator is to the pivot 20, the less movement that will occur as he shifts laterally with the beam.

Supported on the platform 61 is a seat structure 68 positioned at a level whereby an operator in occupancy thereof may have his line of sight above the transverse beam 30 while also retaining a line of vision beneath the beam 21. Control mechanism in the form of a steering wheel 70 is positioned forwardly of the operator's seat 68 and generally controls the steering wheels 22. The steering wheel 70 includes a steering column 71 that projects rearwardly and substantially on the level of the hump 27 and in a substantial continuation with the front portion 23 of the beam 21. It should here be noted that the beam 21 is controlled in its lateral swinging about the pivot pin 20 by a pair of extensible and retractable steering link means in the form of hydraulic cylinders 73, 74 that extend between outer portions of the main frame 12 and opposite sides of the rear beam portion 24. The platform 61 is over part of the link means. Control mechanism for operating the cylinders 73, 74 may also be positioned, such as at a lever 75, adjacent the seat 68 and also substantially on the level of the hump 27.

A pair of earthworking devices indicated in their entirety by the reference numerals 80, 81 are supported on the beam structure 21. The earthworking device 80 is suspended on the transverse beam 30 by a pair of extensible and retractable links or hydraulic cylinders 82, 83 that are pivotally mounted on the yokes 32, 33 respectively and have their lower ends connected to the device 80. The device 80 may therefore be raised and lowered or tilted by suitable adjustment of the cylinders 82, 83. Positioning of the device 80 may further occur by means of a hydraulic cylinder 84 disposed beneath the beam portion 23 and extending between the lower end of the arm 35 and the device 80. The cylinder 84 is used primarily for shifting the entire device 80 transversely and it may in combination with use of the cylinders 82, 83 side-bank the entire device 80. The earthworking device 81 is positioned forwardly of the wheel supports 22 and is of the scarifier type device that includes a series of scarifier teeth assemblies 85 carried by the transverse support bar 86 positioned directly forwardly of the wheels 22. A pair of parallel and upright U-shaped channels 87, 88 is rigid with and extends upwardly from the transverse beam 86. The channels 87, 88 are connected to the forward edge of the downwardly opening U-shaped structural portion 28 by means of upper and lower parallel links 89, 90 that have their forward ends connected to the channels 87, 88 and their rear ends pivotally connected to the side of the member 28. Interconnecting the lower links 90 and rigid therewith is a cross member 91 pivotally connected to the lower end of a hydraulic rod 92 that extends from a cylinder 93. The cylinder 93 is trunnioned at 94 to a downwardly projecting support 95 fixed to the bight portion of the U-shaped structural member 28. The hydraulic cylinder and rod assembly 93, 92 operates to raise and lower the entire earthworking device 81.

There has thus been shown and described a land grading and levelling implement that includes a main traction vehicle having a main frame 12 with a vertical pivot 20 at the forward end thereof. A fore-and-aft extending humpback beam 21 having front and rear ends is supported at the front end on traction wheels 22 and is connected at its rear end to the main frame 12 by the pivot pin 20 so that the entire beam structure 21 may swing laterally. A rigid transferse support or beam 30 is fixed to the forward portion 23 of the fore-and-aft extending beam 21 adjacent the hump 27 and in general overlying relation to the beam 21. The transverse support 30 is provided with outer ends that carry extensible and retractable links 82, 83 that have their lower ends connected to an implement device 80. The support 30 also has a fore-and-aft extending pivot 34 and has an arm 35 supported on the pivot to swing transversely. A hydraulic actuated locking device 40 is supported on the arm and is utilized in operating a lock pin 41 capable of insertion in a series of openings in the transverse support 30. A transversely disposed hydraulically operated link 84 extends beneath the beam 21 and connects the lower end of the arm 35 to the earthworking device 80 for purposes of shifting the entire device 80 laterally and upwardly. An operator's station 60 is provided on the rear portion 24 of the beam 21 and is disposed at a level whereby an operator in the station may have a line of vision over the transverse beam 30 and have a manual operating zone substantially on the level of the hump 27. Control mechanism in the form of the steering wheel 70 and the hydraulic lever 75 is positioned within the manual operating zone and generally is a rearward continuation of the forward portion 23 of the beam 21. An operator seated in the station 60 may, therefore, view both forwardly of the entire implement as well as operation of the earthworking device 80.

Further shown as part of the invention is a forward earthworking device 81 in the form of a scarifier that is supported on the forward end of the beam structure 21 by upper and lower parallel links 89, 90 which cause the scarifier device 81 to be raised and lowered in a substantially predetermined angular position relative to the ground. Consequently the device 81 is not required to have a considerable amount of visual inspection since the angle of penetration is generally set prior to operating the implement.

Other forms and variations of the invention will occur to those skilled in the art. The preferred form has been shown for the purpose of clearly and concisely illustrating the principles of the invention.

What is claimed is:

1. In a land grading and leveling implement having a tractor vehicle adapted to be driven including a main frame supported on traction wheels, the frame having a forwardly disposed vertical pivot, the improvement residing in an elongated fore-and-aft extending beam structure having front and rear ends; a connection between the rear end and the vertical pivot permitting the beam structure to swing laterally; support wheels on the front end of the beam structure; earthworking devices supported on the beam structure; hydraulically controlled extensible and retractable link means extending between the beam structure adjacent its rear end and the frame for effecting lateral movement of the beam structure; an operator's station supported on the beam structure proximate its rear end over at least part of the link means, with control mechanism on the beam structure adjacent the station at least part of which controls the link means.

2. The invention set forth in claim 1 in which the beam structure is humpbacked and is composed of a relatively long front portion extending rearwardly from the front end and a comparatively short inclined rear portion extending forwardly and upwardly from the rear end to join with the front portion at the hump, and the operator's station includes a platform supported on the rear portion rearwardly of and on a level beneath the hump.

3. The invention set forth in claim 2 in which the platform is substantially horizontal and U-shaped and is in overlying relation to the rear portion with transversely spaced leg portions of the U-shaped platform being disposed on opposite sides of the inclined rear portion of the beam structure.

4. The invention set forth in claim 2 further characterized by the operator's station having a seat thereon substantially on the level of the hump affording an operating zone for an operator and for providing an eye level for an operator in occupancy thereof above the level of the hump.

5. The invention set forth in claim 2 further characterized by the control mechanism being disposed in overlying relation to the rear portion and at substantially the same level as the hump.

6. The invention set forth in claim 5 in which the control mechanism is supported by a housing positioned over the rear portion adjacent the hump and in a substantial rearward continuation of the front portion of the beam.

7. The invention set forth in claim 2 further characterized by the front wheels being steerable wheels and a steering wheel for the front wheels is supported on a column projecting rearwardly from the hump and toward the operator's station.

8. The invention set forth in claim 2 further characterized by the earthworking devices being suspended under and supported by the forward portion.

9. The invention set forth in claim 1 in which the earthworking devices are disposed rearwardly of and forwardly of the front wheels and the earthworking device forwardly of the wheels is supported by forwardly projecting upper and lower parallel links supported at their rear ends by structure mounted on the beam structure and connected to the device at their front ends.

10. The invention set forth in claim 1 further characterized by a transverse beam rigid with the elongated beam structure with opposite ends spaced transversely from and on opposite sides thereof, and having suspension links extending downwardly from said opposite ends to an earthworking device; and further characterized by an arm supported on the transverse beam on a horizontal fore-and-aft pivot offset to one side of the fore-and-aft beam structure; a series of lock receiving openings radially spaced from the fore-and-aft pivot and angularly spaced about the pivot; a lock pin supported on the arm for movement into and out of one of the openings; a hydraulic pin actuator on the arm operatively associated with the pin for moving it in respect to an opening; and a hydraulic cylinder and rod assembly extending transversely beneath the fore-and-aft beam between the lower end of the arm and the earth working device.

11. In a land grading and leveling implement having a tractor vehicle adapated to be driven including a main frame supported on traction wheels, the frame having a forwardly disposed vertical pivot, the improvement residing in an elongated fore-and-after extending humpback beam having front and rear ends, a front portion extending rearwardly from the front end, and a rear portion inclined upwardly and forwardly from the rear end to join the front portion at the hump; a connection between the rear end and the vertical pivot permitting the beam to swing laterally; front steerable support wheels on the front end of the beam; earthworking devices supported on the front portion of the beam; extensible and retractable link means extending between the rear portion of the beam and the frame for effecting lateral movement of the beam; an operator's station supported on the rear portion proximate the pivot, at least partially over the link means, and at a level beneath the hump; and implement operating controls on the beam at the level of the hump.

12. In a land grading and leveling implement having a tractor vehicle adapted to be driven including a main frame supported on traction wheels, the frame having a vertical pivot rearwardly of part of the traction wheels, the improvement residing in an elongated fore-and-aft extending humpback beam structure having front and rear ends, a front portion extending rearwardly from the front end, and a rear portion extending forwardly and upwardly from the rear end to join the front portion at the hump; a connection between the rear end and the vertical pivot permitting the beam structure to swing laterally; front support wheels on the front end of the beam; earthworking devices supported on the front portion of the beam forwardly of the hump; means including extensible and retractable link means extending between the rear portion of the beam structure and the frame for effecting lateral movement of the beam structure; and an operator's station supported on the rear portion closely adjacent the pivot and partially over at least part of said means and at a level beneath the hump.

13. In a land grading and leveling implement having a tractor vehicle adapted to be driven including a main frame supported on traction wheels, the frame having a forwardly disposed vertical pivot, the improvement residing in an elongated fore-and-aft extending humpback beam having front and rear ends, a front portion extending rearwardly from the front end, and a rear potion extending fowardly and upwardly from the rear end to join the font portion at the hump; a connection between the rear end and the vertical pivot permitting the beam to swing laterally; steering link means adjacent the pivot and extending between the beam and frame; front support wheels on the front end of the beam; a transverse rigid support fixed to the beam closely to and forwardly of the hump and in overlying relation to the beam and having opposite ends on opposite sides of and above the level of the beam, the support further having a fore-and-aft pivot offset to one side of and above the level of the beam; an earthworking device beneath the front portion of the beam forwardly of the hump, extensible and retractable links extending between the ends of the support and the device for effecting vertical tilting movement of the device; an arm supported on and depending from the pivot with a lower end thereof beneath the beam; means between the support and arm locking the arm at various angular positions; a transversely disposed hydraulically operated extensible and retractable link extending beneath the beam and between the arm's lower end and the device for shifting the device transversely; and an operator's station supported on the rear portion close to the pivot and over at least part of the steering link means, the station being at a level beneath the hump and whereby an occupant of the station has his line of sight above the transverse support.

14. In a land grading and leveling implement having a rear traction vehicle with a main frame and transversely spaced traction wheels; a vertical pivot on the frame between the traction wheels; an elongated fore-and-aft extending beam structure having a rear end carried on the pivot, a forward end, a front portion extending rearwardly from the front end, and a rear portion extending forwardly and upwardly from the rear end and rigidly joining the front portion; front wheels on the front end of the beam structure; laterally disposed and hydraulically controlled link means extending between the rear portion of the beam structure and the frame for effecting lateral movement of the beam structure; an operator's station supported on the rear portion extending rearwardly therefrom and disposed over at least part of the link means and closely adjacent the vertical pivot.

15. In a land grading and leveling implement having a rear traction vehicle having a main rectangular shaped frame with a front transverse portion; front and rear pairs of transversely spaced traction wheels mounted on the frame with the front wheels being forward of the transverse portion; a vertical pivot on the transverse portion centrally of and rearward of the front traction wheels; an elongated fore-and-aft extending beam structure having a rear end carried on the pivot and a forward end, a front portion extending rearwardly from the forward end, and a rear portion extending forwardly and upwardly from the rear end to rigidly join with the front portion; front wheels on the front end of the beam structure; laterally disposed and hydraulically controlled link means extending between the rear portion of the beam structure and the frame for effecting lateral movement of the beam structure; an operator's station supported on the rear portion with the rear part thereof being within the inboard planes of the front traction wheels and disposed over at least part of the link means.

References Cited
UNITED STATES PATENTS

| | | |
|---|---|---|
| 2,130,274 | 9/1938 | Harrison et al. |
| 2,259,747 | 10/1941 | Gustafson. |
| 2,494,324 | 1/1950 | Wright _____ 37—156 |
| 2,655,743 | 10/1953 | Ross _____ 37—156 |
| 3,022,585 | 2/1962 | Bradley _____ 37—117.5 X |
| 3,038,268 | 6/1962 | Vivier _____ 37—156 |
| 3,052,997 | 9/1962 | Holland. |

ANTONIO F. GUIDA, Primary Examiner.

ALAN E. KOPECKI, Assistant Examiner.

U.S. Cl. X.R.

180—51; 172—781